Feb. 4, 1964   R. D. GOULD ETAL   3,120,091
TREE SHAKER
Filed Jan. 24, 1963   8 Sheets-Sheet 2
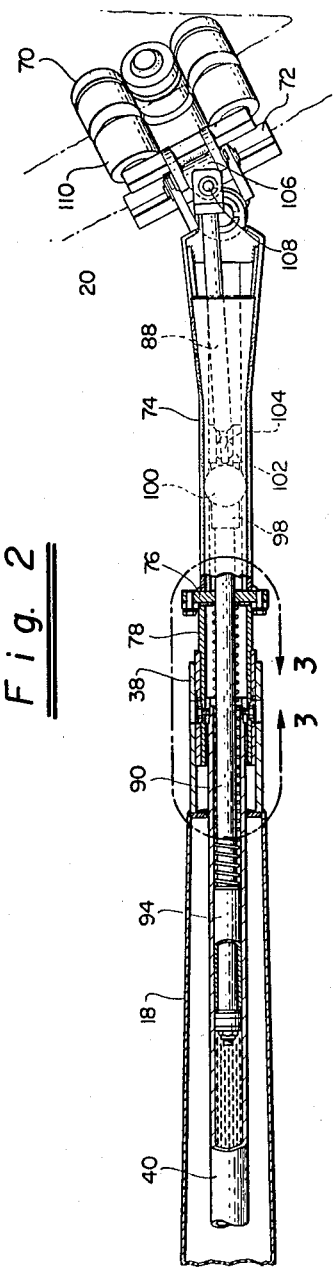
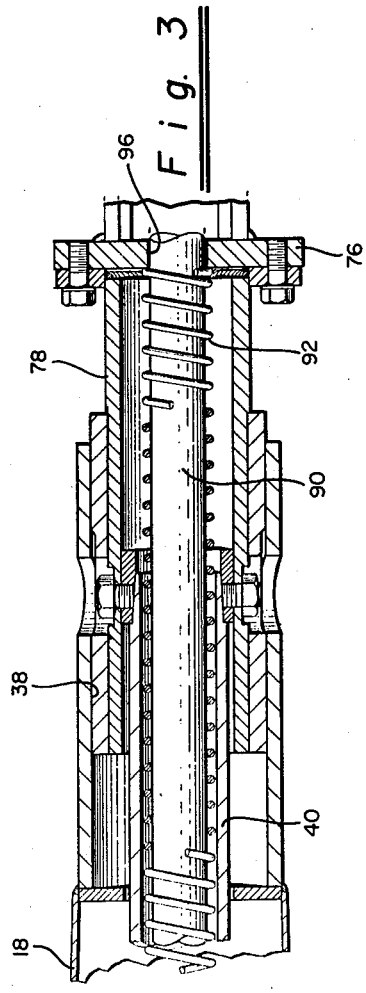
INVENTORS
Russell D. Gould
John E. Richter
BY
Attorneys

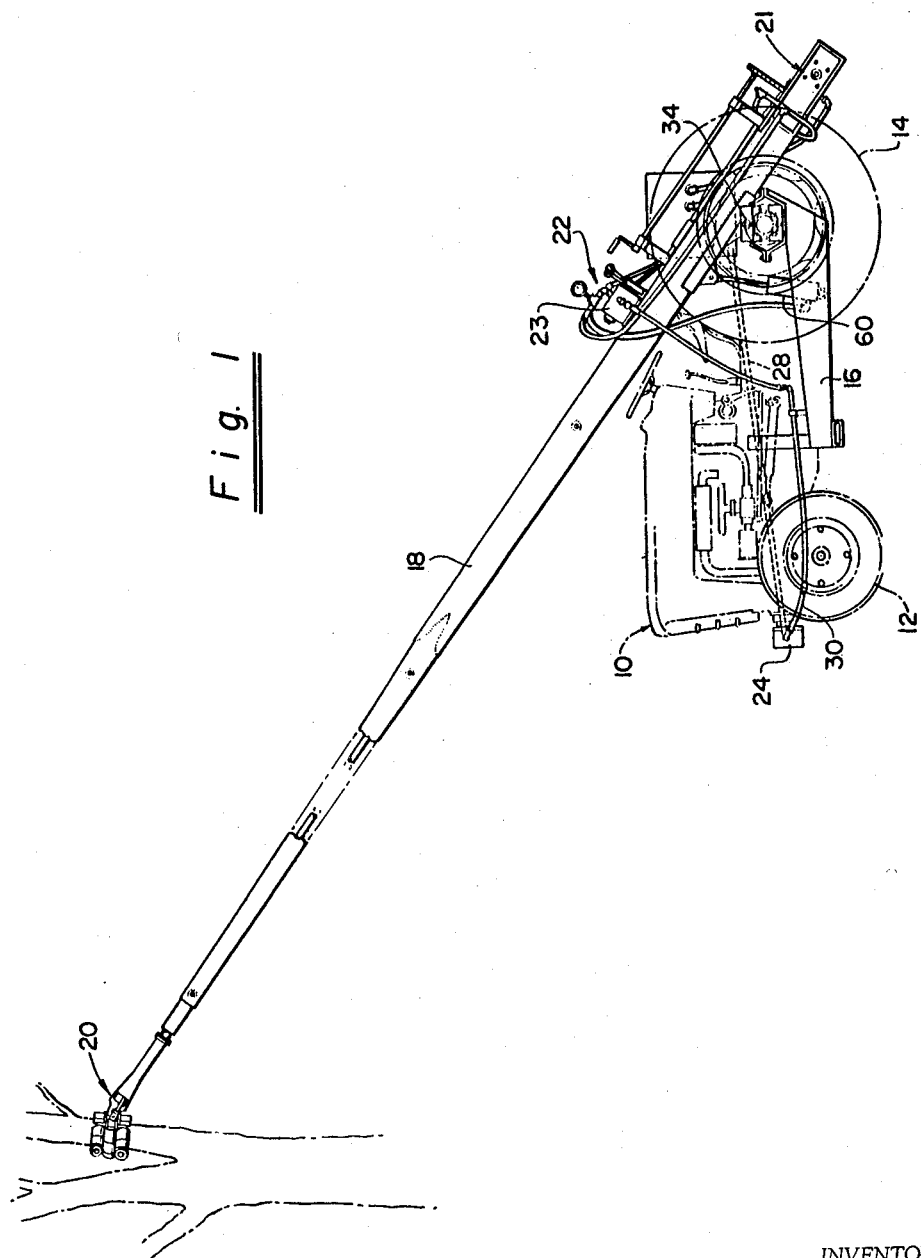

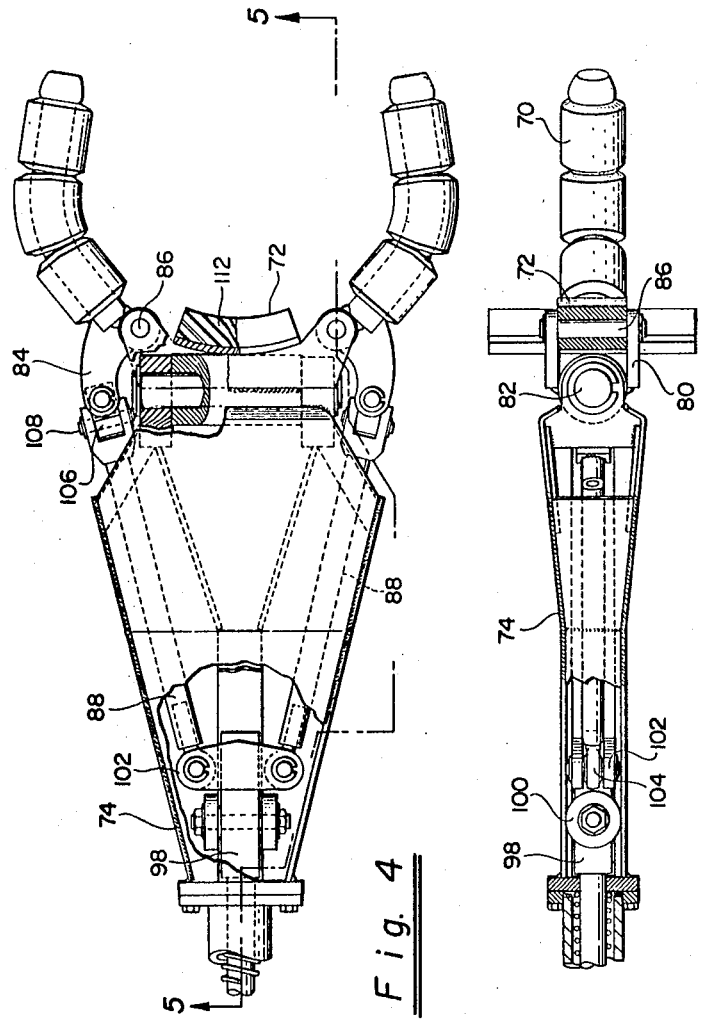

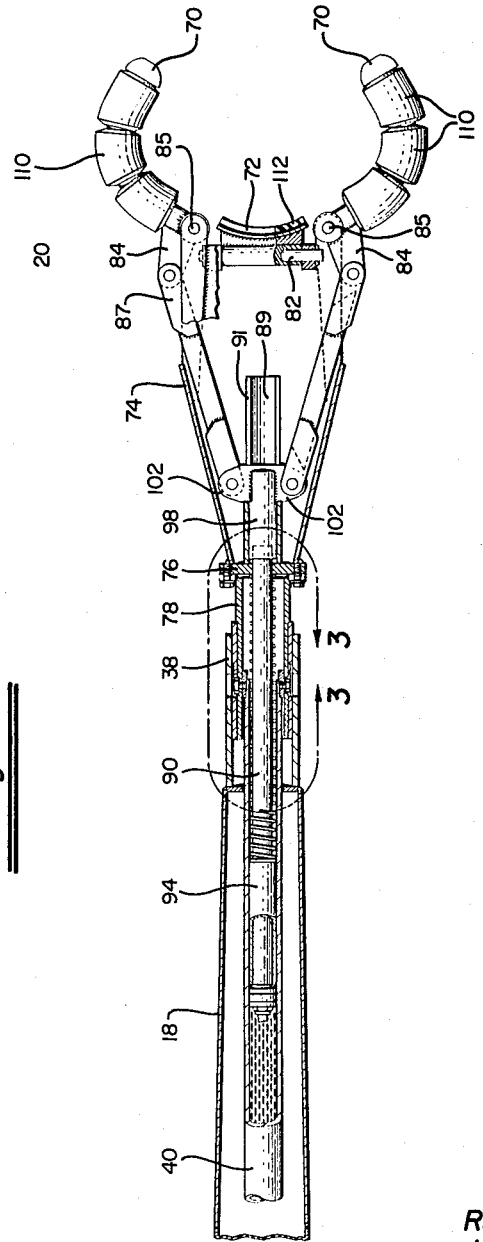

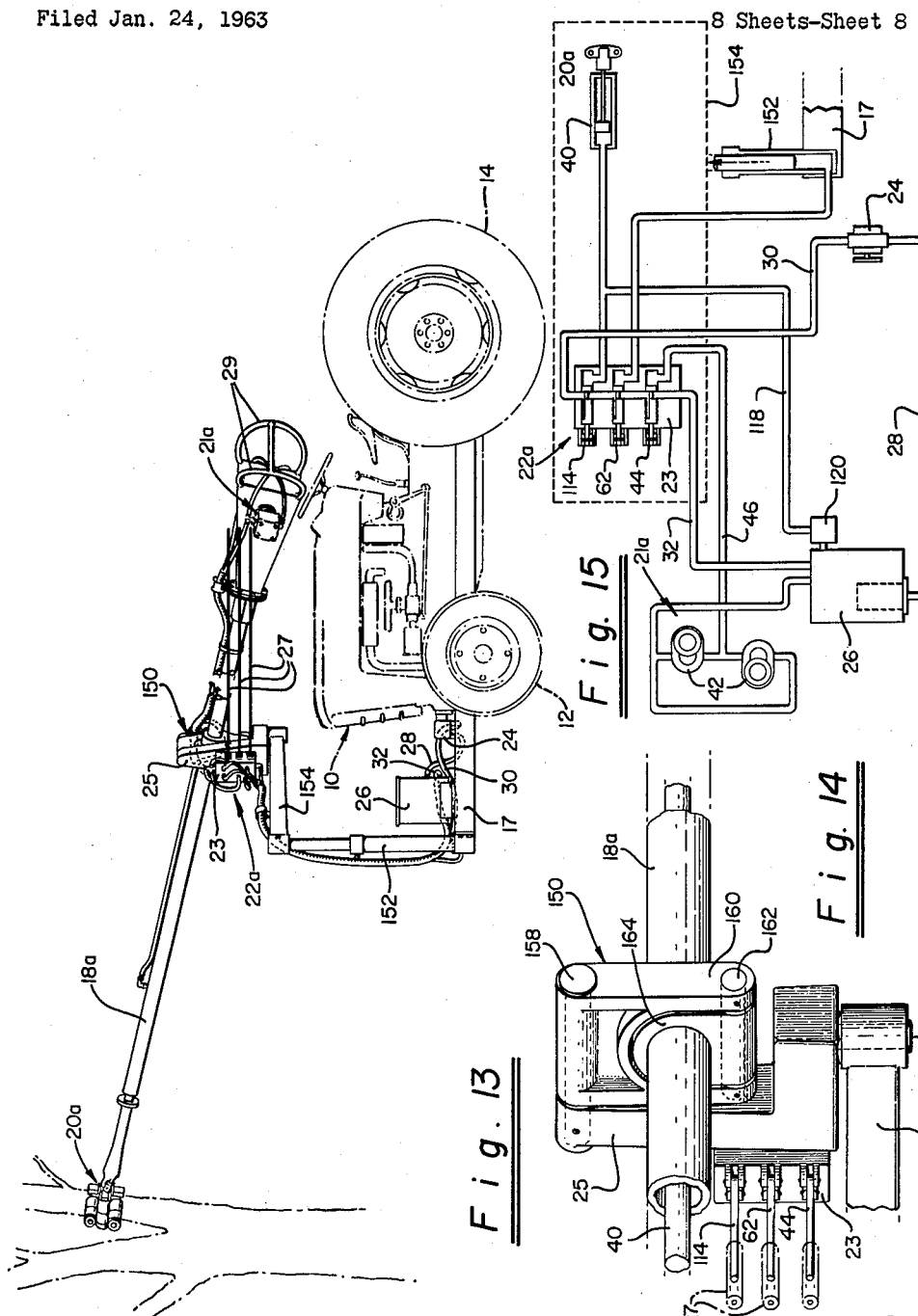

United States Patent Office 3,120,091
Patented Feb. 4, 1964

3,120,091
TREE SHAKER
Russell D. Gould, 12570 N. Capitol Ave., and John E.
Richter, 502 Morse St., both of San Jose, Calif.
Filed Jan. 24, 1963, Ser. No. 253,674
25 Claims. (Cl. 56—328)

This invention relates generally to tree shaking machines, are particularly to machines capable of carrying out nut and fruit harvesting operations such as disclosed in Patent 2,804,743.

In conventional tree shaker machines, an elevatable boom is provided and is equipped with a reciprocating central member which extends lengthwise to the outer end of the boom. A yoke provided at the end of the reciprocating member is adapted to engage a limb or other portion of the tree to provide the shaking action. In operation, the tractor carrying the boom is advanced a slight distance, prior to shaking, to place the tree or limb under bowing stress. This is necessary to prevent a destructive pounding or hammering of the tree during the shaking operation.

While machines of the type described have been satisfactorily used for a number of years, it has been found that their efficiency of operation is impaired by the particular means employed to engage and shake the tree. Considerable time is spent, for example, in first engaging a limb with the boom, subsequently advancing the tractor to stress or bow the limb, and then actuating the shaking mechanism. Moreover, since the yoke is normally in retracted position during the engagement and stressing, the limb may be excessively stressed and consequently damaged or even broken as the yoke is extended during the shaking operation. A further difficulty lies in the rigid, unyielding construction of the yoke, which presents edge surfaces capable of gouging or otherwise damaging the protective bark of the tree.

In general, it is an object of the present invention to provide an improved machine of the above character, and in particular to provide means to positively graps a limb, branch or other portion of a tree to effect a careful efficient shaking action.

It is another object of the invention to provide a tree shaking machine of the above character which is capable of faster and more efficient shaking, and which makes possible a simplified control of the entire shaking operation.

It is a further object of the invention to provide a machine of the above character in which the tree engaging portion functions to positively align itself with the engaged tree member, to thereby reduce bark abrasion or damage during the shaking operation to a minimum.

Additional objects of the invention will appear from the following description in which preferred embodiments have been set forth in conjunction with the accompanying drawing.

Referring to the drawings:

FIGURE 1 is a side elevational view with parts in phantom, illustrating a machine incorporating the present invention.

FIGURE 2 is an enlarged view in section and elevation of an improved hooking and shaking mechanism employed with such machine, showing the hooking mechanism in a closed or shaking position.

FIGURE 3 is a detail view of the portion 3—3 of FIGURE 2.

FIGURE 4 is an enlarged view in plan and section of the hooking mechanism of FIGURE 2, showing the mechanism in an open or disengaged position.

FIGURE 5 is a view in section along the line 5—5 of FIGURE 4.

FIGURE 6 is a view like FIGURE 4 showing another embodiment of the hooking mechanism.

FIGURE 13 is a view like FIGURE 1, illustrating a modified machine embodying the invention.

FIGURE 14 is an enlarged detail view in perspective, illustrating the mounting of the boom in the machine of FIGURE 13.

FIGURE 15 is a fragmentary view like FIGURE 11, illustrating a further modification of the hydraulic system useful with the machine of FIGURE 13.

Figure 7:
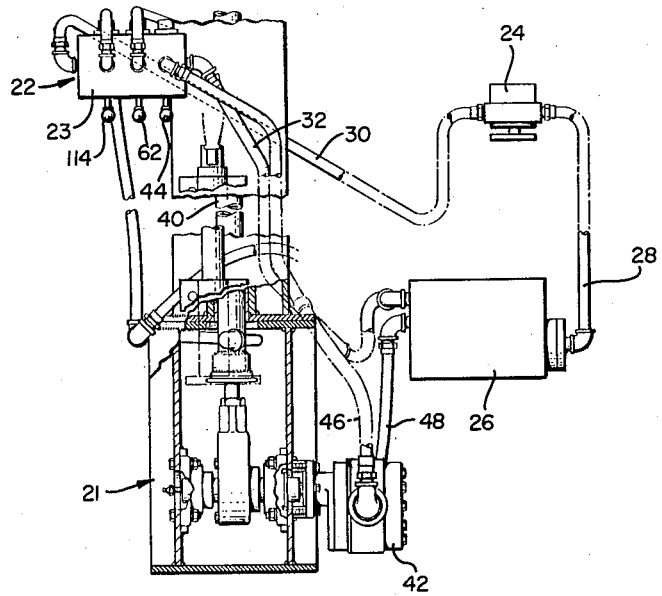
FIGURE 7 is a plan view illustrating the operating mechanism associated with the machine, including the hydraulic system.

The machines illustrated in FIGURES 1 and 13 are shown in conjunction with an agricultural tractor 10 which is provided with forward ground engaging steering wheels 12 and rear driving wheels 14. In the embodiments of FIGURE 1, a subframe 16 is carried by the rear wheels of the tractor, and provides a means to pivotally mount an elevatable boom 18 which carries a hooking mechanism 20 and a shaking mechanism 21. In the embodiment of FIGURE 13, a frame 17 projects forwardly of the tractor, and provides a means to freely suspend a floating or "inertia" boom 18a, which likewise carries a hooking mechanism 20a and a shaking mechanism 21a. In the machine of FIGURE 1, all controls for the boom, hooking and shaking mechanisms are carried on the boom in a position of easy access to the operator, as generally indicated at 22. A somewhat similar arrangement is employed with the machine of FIGURE 13, with the controls being carried on a boom pivot mount 25 and provided with rearwardly extending actuators 27, as indicated at 22a.

Figure 8:
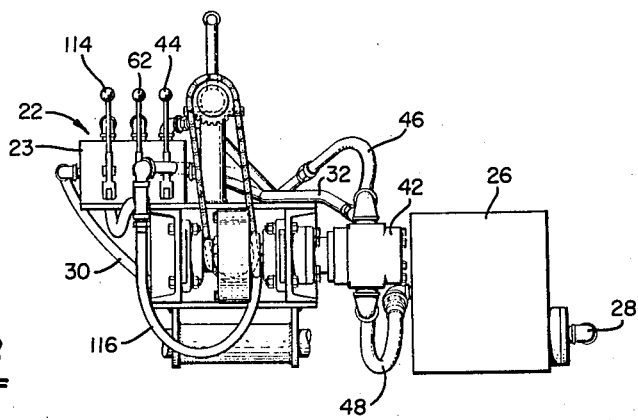
FIGURE 8 is an end view thereof.

In preferred embodiments of the machine, the associated mechanisms of the shaker apparatus derive power from a hydraulic pump 24 operated by the drive shaft of the tractor. As illustrated in FIGURES 7 and 8, the intake side of the pump is in communication with a suitable reservoir 26 of hydraulic fluid through the conduit 28. The discharge of the pump is carried by the conduit 30 to a control unit or box 23 associated with the boom. From the controls, hydraulic fluid is returned to the reservoir 26 through the conduit 32. As will appear, various control valves at the unit 23 can be operated to divert hydraulic fluid to operate the boom, hook and shaker mechanisms. In addition, manually operated means (FIGURE 9) are provided to rotatably position the hook mechanism in FIGURE 1, and handgrips 29 to permit manipulation of the hook mechanism in FIGURE 13.

Referring particularly to the machine of FIGURE 1, the boom 18 is mounted for pivotal movements about a pivot axis 34 carried by the rear axle of the tractor. The boom may be of any suitable construction, although it preferably is of "stressed-skin" construction stiffened by an internal framework. Such construction is advantageous in that it reduces the weight of the boom, facilitating maneuverability and increased operating efficiency of the tractor. If desired, a truss construction of the type disclosed in Patent 2,804,743 can also be employed.

Figure 9:
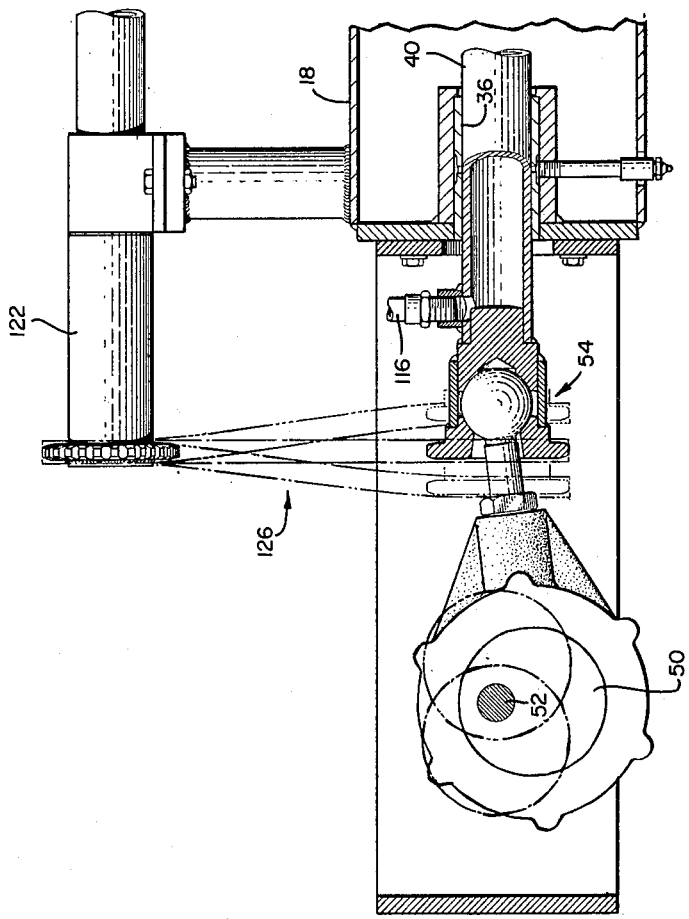
FIGURE 9 is an enlarged detail view of the reciprocatory mechanism.

As particularly shown in FIGURES 3 and 9, the boom 18 provides means for mounting spaced bearings 36 and 38 for a reciprocating shaker tube or shaft 40. Reciprocative movements of this shaft 40 are obtained by operation of a hydraulic motor 42, controlled by a lever and valve control indicated generally at 44. The latter may include a spool type valve or other suitable valve means capable of diverting sufficient hydraulic fluid through the lines 46 and 48 to operate the motor 42. A rotatable eccentric 50 secured to the shaft 52 of the motor acts to positively reciprocate the shaft 40 lengthwise of the boom, through a universal connection at 54. Reciprocating mechanisms of this general type have been previously disclosed (see Patent 2,804,743) and form no part the the present invention.

In carrying out shaking operations, it is necessary that the free end of the boom 18 be freely elevatable to a position adjacent a limb or branch of a tree. In the apparatus of FIGURE 1, this is obtained by a diversion of hydraulic fluid to a hoist cylinder 60, which is pivotally connected between the boom 18 and the subframe 16 (FIGURE 1). Operation of the hoist is controlled by the lever and valve control 62. This control unit may likewise include a spool valve, capable of diverting hydraulic fluid to the cylinder 60 upon actuation in one direction, and of releasing the fluid for return to the system upon actuation in the opposite direction. In a neutral position of control, the boom 18 can be held in any desired position of elevation.

It is a feature of the present invention that the free end of the boom 18 is equipped with a hooking mechanism 20 by which a tree member can be firmly and resiliently grasped for shaking, with a minimum of impact or abrasion of the bark, or undesired stress upon the engaged member. The mechanism 20 generally comprises a pair of opposed, resilient hook members 70, pivotally mounted at either side of a curved pad or other cushion means 72, at the end of the hollow shaft 40. As will be explained, the hooks can be resiliently closed behind a branch or other tree member to positively grip the same against the pad 72 during the shaking.

In the embodiment of the hooking mechanism illustrated in FIGURES 2 to 5, the entire hooking mechanism 20 is mounted for pivotal movements relative to the boom 18, and in particular with respect to a housing 74 secured by the plate 76 to an extension 78 of the reciprocating shaft 40. Such pivotal movement can be obtained by means of a support unit 80 mounted for pivotal movements about a pin 82 carried within extending portions of the housing 74. In this embodiment of the invention, the curved pad 72 is preferably fixed to the support 80 so as to pivot therewith about the pin 82. The hook members 70 can be actuated by cranks 84 mounted for pivotal movements on pins 86, likewise carried by the support unit 80. As will be understood, this construction permits pivotal movements of the hooks in two planes, in a vertical plane about the pin 82 and in a horizontal plane about the pins 86. Preferably the hooks 70 are laterally offset from one another, as illustrated in FIGURES 1 and 2, to permit a full closing action of the hooks.

The hooks are actuated by link means 88 connected to an inner shaft 90 slidably received within the hollow shaft 40. In the illustrated apparatus, the inner shaft is normally biased into a rear position within the hollow shaft by means of spring 92, which is positioned between the plates 78 and a piston 94 mounted on the inner end of the shaft 90. As best illustrated in FIGURE 3, the outer end of the shaft 90 extends through an aperture 96 in the plate 78, and is rigidly secured to a push rod 98. The latter is positioned within the housing 74 in a frictionless manner by ball bearings 100, or other suitable means, and is provided with winglike extensions 102 adapted to provide a universal connection with ball joints 104 provided at the inner ends of the links 88. At their outer ends, the links 88 are provided with universal connections with the cranks 84 by means of pivot couplings 106 carried by the cranks, and providing support for the end pivots 108 of the links.

Referring to FIGURE 4, the hook members 70 are preferably provided with segmented resilient coverings 110 which serve to cushion the contact with the tree. These resilient members may be of any suitable material such as rubber or a suitable elastomer. The base cushion or pad 72 is likewise provided with a thick, resilient layer 112 of a similar material. The principal function of the pad 72 is to align itself, and the hooks 70 carried by the pivot support 80, with the trunk tree limb or branch, prior to closing the hooks for shaking. The pad 72 also serves to cushion the force of engagement and to provide a maximum distribution of the shaking force over the engaged portion of the tree. The function of the hook members, in turn, is to resiliently grip the branch or other tree member against the thick cushion of the pad 72, to thereby virtually eliminate undesired pounding or gouging of the tree during the shaking operation. If desired, pads 72 of different curvature may be provided as necessary in various agricultural applications (e.g., nut harvesting, fruit harvesting, etc.), to insure a maximum protective engagement between the hooking mechanism and the tree.

A somewhat simplified embodiment of the hooking mechanism is illustrated in FIGURE 6. In this embodiment, only the curved pad 72 is mounted for pivotal movement about the pin 82 carried by the housing 74. Cranks 84 are separately mounted for pivotal movements on pins 85 likewise supported by the housing 74. Actuation of the hooks is again accomplished by link means 87 but in this case the links are secured by a direct pivotal attachment to the cranks 84 and to the wing extensions 102 of the push rods 98. FIGURE 6 also illustrates a somewhat modified support of the push rod in that the latter is slidably received within an inner tubular portion 89 of the housing 74. Slots 91 can be provided in the sides of the tube 89 to insure a proper sliding alignment of the push rod and link attachments relative to the housing.

In either of the above embodiments, operation of the hooking mechanism 20 is achieved by means of a lever and valve control 114, which may be of the same general construction as the control previously described. Thus operation of the lever 114 in one direction causes hydraulic fluid to be admitted through the conduit 116 to the interior of the hollow shaft 40 where it acts upon the piston 94 to extend the push rod and line means to close the hook members 70 against the pad 72. In an opposite position of the lever 114, spring 92 causes the hydraulic fluid to return through conduit 118 and an adjustable relief valve 120 to the reservoir 26. Preferably the valve 120 functions to also limit the fluid pressure in the system so that the closing pressure of the hook members is insufficient to damage the bark of an engaged tree member.

Figure 10:
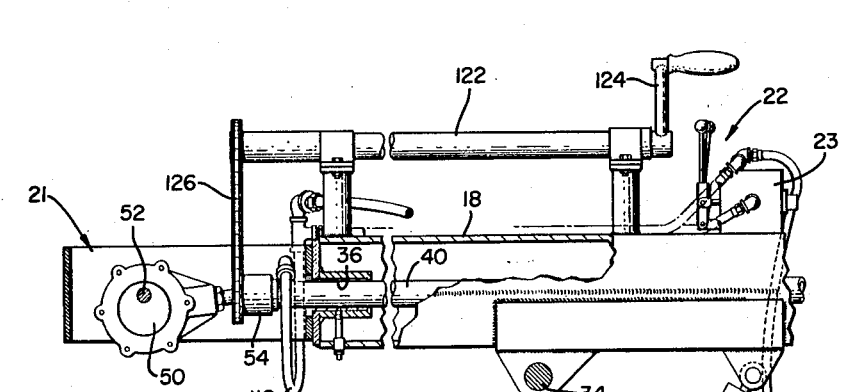
FIGURE 10 is a like view on a reduced scale, illustrating the mounting of all control mechanisms on the elevatable boom.

As illustrated in FIGURE 10, manual means are also provided to rotatably position the hooking mechanism 20 relative to the boom 18. Such means (previously disclosed in Patent 2,804,743) generally comprises a control rod 122 having a crank 124 to adjustably position the chain and sprocket assembly 126 operatively engaging the rear end of the shaft 40.

The overall operation of the machine shown in FIGURE 1 is summarized as follows:

Assuming an open position of the hooking mechanism 20, the boom is elevated by the control 62 and the tractor advanced until the pad 72 engages a desired limb for shaking. During this operation, the hooks 70 can be rotatably adjusted by means of the crank 124. As the pad 72 engages the limb, it is pivoted about the pin 82 so that it becomes positively aligned with the under surface of the branch. This positioning of the pad insures an even distribution of the shaking force and provides a maximum protection against bark damage or other injury.

The control 114 is now operated to close the hook means 70 to partially or completely encircle the limb and to firmly press it against the pad 72. Shaking is commenced by manipulation of the control 44 to actuate the hydraulic motor 42. The hydraulic pressure maintaining the hooks 70 in closed position is maintained by virtue of the flexible connection of the conduit 116 with the inlet port to the shaker shaft 40 (FIGURES 9 and 10). Upon termination of the shaking operation, and release of the hydraulic pressure from within the hollow shaker shaft 40, the hook means 70 are returned to an open position by the spring 92 for the next operation. Due to the centralized location of the controls, all these operations can be quickly and easily carried out without any need to initially stress the limb or to otherwise effect delay in the operation of the machine.

In carrying out the above operations, a number of advantages are obtained by use of the hooking mechanism illustrated in FIGURES 2 to 5. Specifically all portions of this hooking mechanism readily align themselves with the engaged tree surface during the shaking operation to insure a minimum of lateral movement adjacent the bark, such as might strip, gouge or otherwise damage the bark. Thus in FIGURE 2 the base pad 72 has engaged the branch 130 and rotated itself and the hook members 70 about the pivot 82 into axial or lengthwise alignment with the branch. The hook members 70 have also been pivoted into engagement with the back side of a branch to exert a closing pressure in a direction directly opposed or perpendicular to the back pad 72. Such hooking engagement insures an even application of pressure at all points of contact with the branch, without any exertion of lateral forces along the length of the branch. During the subsequent shaking action, this positive alignment reduces to a minimum the chances of damaging frictional abrasion or damage to the bark.

In the machine so far described, separate control levers 44 and 114 are provided for both the shaking mechanism 21 and for the hooking mechanism 20. In a modified arrangement illustrated in FIGURE 12, it is possible to combine the control of these operations by use of suitable flow dividing and pressure reducing valve mechanism 130. Such valve mechanism permits operation of a single control 132 to admit hydraulic fluid to both the hollow shaft (through the conduit 116a) and to the hydraulic motor 42a (through the conduit 134). The result is a closing of the hook means 70 about the branch simultaneously with initiation of the shaking operation. The valve mechanism 130 can also be of the type which permits operation in sequence, as described in connection with FIGURE 11. Either type operation is facilitated in the present invention by the construction of the cushion or pad 72, which functions to align itself with the branch and to absorb and distribute the shaking forces uniformly over the branch.

FIGURE 13 illustrates a modification of the machine wherein the boom 18a is supported in a freely suspended or floating relation by the mounting 150. The function of the mounting 150 is to utilize the inertia of the boom unit 18a to oppose the reactive and resilient forces exerted by the tree, and thereby to cushion and control the shaking action.

Referring particularly to FIGURE 13, the boom 18a is supported on the forward frame 17 of the tractor by a vertical hoist 152. The hoist in turn pivotally supports a horizontal swing arm 154, at the end of which is journaled a pivot shaft or support 156 for the boom pivot mount 25. At its upper end, the pivot mount 25 carries a horizontally extending pivot shaft 158, upon which is suspended a gimbal mounting 160 for the boom 18a.

As best seen in FIGURE 14, the gimbal mounting suspends a lower pivot shaft 162 upon which is freely mounted a bearing or collar 164 for the boom. The collar 164 is preferably mounted near the center of gravity of the boom 18a to facilitate manipulation of the boom, and is constructed to permit rotatable adjustment of the boom in tree shaking operations.

From the foregoing, it will be apparent that the free end of the boom 18a can be freely elevated to a position adjacent a limb or branch of a tree by means of the handgrips 29. During this operation, the hoist cylinder 152 functions to raise and lower the horizontal swing arm 154 to a desired position for the operator. However, the angle of elevation of the boom is controlled by the operator, rather than by the hoist cylinder 60, as in the machine of FIGURE 1.

Figure 11:
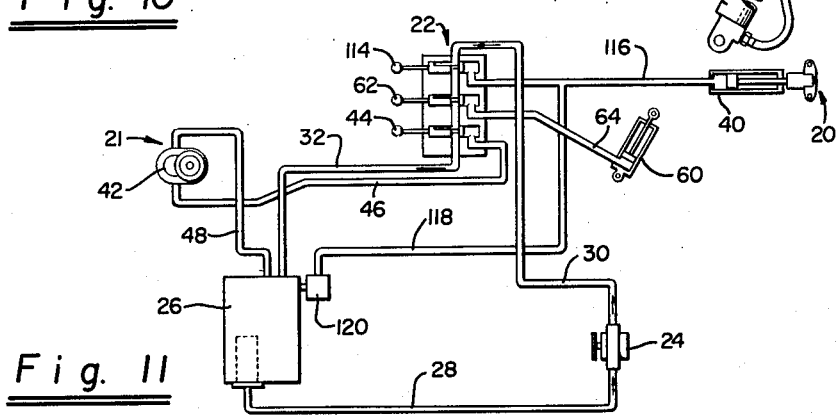
FIGURE 11 is a schematic view of the shaker mechanism illustrating the operation thereof.
Figure 12:
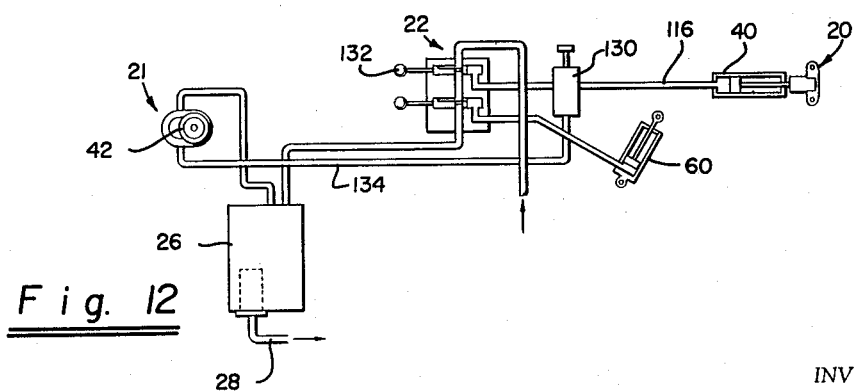
FIGURE 12 is a view like FIGURE 11, illustrating another embodiment of the hydraulic system.

The boom 18a is hydraulically controlled by means of the control unit 23 (FIGURE 15) which may be identical to the control unit previously described, and shown in FIGURES 10 and 11. Thus, in the illustrated control system, the lever and valve control 62 provides means for controlling the operation of the hoist cylinder 152, through the rearwardly extending actuator or handle 27. The lever and valve control 44 similarly controls the operation of the reciprocating mechanism for the shaft 40. The lever and valve control 114 operates the hooking mechanism 20a, to actuate the unit member 70 to grasp a tree member against the pads 72.

The operation of the machine shown in FIGURE 13 is summarized as follows:

With the hooking mechanism 20a in open position, the tractor 10 is moved into a desired position adjacent a tree. This operation can be conveniently carried out by a single operator or, where speed is a primary consideration, an additional boom operator who may simultaneously swing the horizontal arm 154 to a desired position. The boom pivot mount 25 can then be rotated and the boom swung vertically in the gimbal mounting 150 to position the back pad 72 against the under surface of the branch to be shaken. During this operation, the operator can also rotate the boom within the collar 164 to properly align the back pad longitudinally of the branch. As the pad 72 engages the limb, it additionally pivots about the pin 82 so that the surface of the pad positively aligns itself lengthwise of the branch, in the manner previously described. The control 114 is now operated to close the hooking mechanism to grasp the branch, and shaking commenced by manipulation of the control 44 to actuate the hydraulic motor 42.

During the shaking operation, the branch is reciprocated by the opposed inertia forces of the branch and the boom, as the latter is reciprocated by the reciprocating mechanism 21a. It will be understood that the weight of the boom and the motor provides a sufficient moment of inertia to the unit to provide the desired shaking operation.

FIGURE 15 illustrates a modified system for the machine of FIGURE 13 wherein two hydraulic motors are employed instead of just one. Such an arrangement is particularly advantageous with the freely suspended or "inertia" boom 18a. It will be understood that the operation of the hydraulic motors (see FIGURE 9) is such that the eccentrics 50 rotate 180° out of phase with one another, thereby effectively doubling the reciprocatory effect. Since the boom 18a reciprocates or "floats" with the branch, the additional reciprocating effect provided by the second motor is highly beneficial to the shaking operation without appreciably increasing the strain upon the engaged tree member.

This application is a continuation-in-part of our copending application Serial No. 70,275, filed November 18, 1960, which, in turn, is a continuation-in-part of an earlier application Serial No. 9,478, filed February 18, 1960, now abandoned.

We claim:

1. In a tree shaking mechanism, an elongated boom, a hooking mechanism carried by said boom, shaking means also carried by said boom to axially reciprocate said hooking mechanism, said hooking mechanism including cushion means mounted for pivotal movement relative to the boom and resilient members mounted adjacent the cushion means for movements adapted to positively grasp a tree member against said cushion means, and means to selectively actuate said resilient members and said shaking means whereby the latter serves to reciprocate said hooking mechanism to achieve to and fro shaking of said tree member.

2. A tree shaking mechanism as in claim 1 wherein said cushion means is pivoted about an axis perpendicular to that of said boom and substantially in the plane of said resilient members.

3. In a tree shaking mechanism, an elongated boom, a hooking mechanism carried by said boom, shaking means also carried by said boom to axially reciprocate said hooking mechanism, said hooking mechanism including support means mounted for pivotal movement relative to the boom, opposed hook means pivotally mounted on said support means and cushion means carried by the support means between said hook means, and means to selectively actuate said hook means to positively grasp a tree member against said cushion means, and means to selectively actuate said shaking means whereby the latter serves to reciprocate the hooking mechanism to achieve to and fro shaking of said tree member.

4. A tree shaking mechanism as in claim 3 wherein said cushion means presents a curved surface adapted to cooperate with said hook means to provide a contact surface corresponding to that of the engaged tree member.

5. A tree shaking mechanism as in claim 3 wherein said opposed hook means are offset so as to close behind an engaged tree member.

6. In a tree shaking mechanism, an elongated boom, a hooking mechanism carried by said boom, shaking means also carried by said boom to axially reciprocate said hooking mechanism, said hooking mechanism including support means mounted for pivotal movement relative to the boom, said support means carrying cushion means and resilient members mounted adjacent thereto for pivotal movements relative to said cushion means, means to selectively actuate said resilient members to positively grasp a tree member against said cushion means, said last named means including a universal connection to accommodate pivotal movements of both said resilient members and said support means relative to the boom, and means to selectively actuate said shaking means whereby the latter serves to reciprocate said hooking mechanism to achieve to and fro shaking of said tree member.

7. A tree shaking mechanism as in claim 6 wherein said means to selectively actuate the resilient members includes link means, universal connections between said link means and said resilient members, and universal connections between said link means and said means to selectively actuate said resilient members.

8. In a tree shaking mechanism, first shaft means, means to axially reciprocate said first shaft means, a second shaft means telescopingly engaging said first shaft means, means normally urging said second shaft means into a retracted position relative to said first shaft means, a hooking mechanism mounted on said first shaft means, said hooking mechanism including cushion means and resilient members mounted adjacent the cushion means for pivotal movements relative thereto, said cushion means being mounted for pivotal movement relative to said first shaft means, link means operatively engaging said second shaft means and each of said resilient members, and means to urge said second shaft means into an extended position to cause said resilient members to positively grasp a tree member against said cushion means to achieve to and fro shaking.

9. In a tree shaking mechanism, first shaft means, means to axially reciprocate said first shaft means, second shaft means telescopingly engaging said first shaft means, means normally urging said second shaft means into a retracted position relative to said first shaft means, a hooking mechanism pivotally mounted on said first shaft means, said hooking mechanism including cushion means and opposed hook members on either side of said cushion means, said opposed hook members being mounted for pivotal movement relative to said cushion means, link means operatively engaging said second shaft means and each of said opposed hook means, and means to urge said second shaft means into an extended position to cause said hook members to positively grasp a tree member against said cushion means for to and fro shaking.

10. A tree shaking mechanism as in claim 9 wherein both of said cushion means and said opposed hook members are mounted for simultaneous pivotal movements with respect to said first shaft means.

11. A tree shaking mechanism as in claim 9 wherein said first shaft means is hollow and said second shaft means is slidably received therein.

12. A tree shaking mechanism as in claim 11 wherein said means to urge the said second shaft means to an extended position comprises hydraulic fluid under pressure contained within said hollow shaft means.

13. A tree shaking mechanism as in claim 9 wherein said means urging said second shaft means to a retracted position includes spring means engaged between said first shaft means and said second shaft means.

14. A tree shaking mechanism comprising: a wheeled vehicle, an elongated elevatable boom carried by said vehicle, a hooking mechanism carried by said boom, shaking means carried by the boom to axially reciprocate said hooking mechanism, said hooking mechanism including opposed resilient members mounted on either side of cushion means, said cushion means being mounted for pivotal movement relative to said boom, and actuating means mounted for movement relative to said hooking mechanism to actuate said opposed resilient members to effect a positive encircling and grasping of a tree member against said cushion means.

15. A tree shaking mechanism as in claim 14 wherein said boom is mounted in freely suspended relation on said wheeled vehicle.

16. A tree shaking mechanism as in claim 14 wherein said boom is mounted for pivotal movements relative to a fixed pivotal mount carried by said wheeled vehicle.

17. A tree shaking mechanism comprising: a tractor; a boom mounted for pivotal movement relative to a transverse axle of said tractor; means to pivot said boom whereby its free end is elevatable with respect to the ground; hollow shaft means carried within said boom; means to axially reciprocate said hollow shaft means; an inner shaft slidably received within said hollow shaft means; spring means between said shaft means normally urging said inner shaft toward a rear position within said hollow shaft means; a hooking mechanism carried at the outer end of said hollow shaft means, said hooking mechanism including support means mounted for pivotal movement relative to said hollow shaft means, opposed hook members pivotally mounted on the support means, and cushion means mounted on said support means between said hook means; means to urge said inner shaft outward with respect to said hollow shaft means; and link means associated with said hook means and said inner shaft means whereby outward movement of the latter effects a positive encircling and gripping movement of said hook means relative to each other and said cushion means.

18. A tree shaking mechanism as in claim 15 wherein said boom is pivotally mounted on a rear axle of said tractor.

19. A tree shaking mechanism as in claim 16 wherein control mechanisms for elevating said boom, and for operating said hollow and inner shafts are carried by and movable with said boom.

20. In a tree shaking mechanism, first shaft means, means to axially reciprocate said first shaft means, second shaft means telescopingly engaging said first shaft means, means normally urging said second shaft into a retracted position relative to said first shaft means, opposed hook means pivotally mounted on said first shaft means, cushion means mounted for pivotal movement between said hook means, means operatively engaging said second shaft means and each of said opposed hook means, and means to urge said second shaft into an extended position whereby said hook means are caused to positively grasp a tree member against said cushion means for to and fro shaking.

21. A tree shaking mechanism comprising a tractor, a boom mounted for pivotal movements relative to a transverse axle of said tractor, means to pivot said boom whereby its free end is elevatable with respect to the ground, hollow shaft means carried within said boom, means to axially reciprocate said hollow shaft means, an inner shaft slidably received within said hollow shaft means, spring means between said shaft means normally urging said inner shaft into a rear position within said hollow shaft means, opposed hook means mounted for pivotal movements adjacent the outer end of said hollow shaft means, cushion means mounted for pivotal movement between said hook means, means to urge said inner shaft outward with respect to said hollow shaft means, and means associated with said hook means and said inner shaft means whereby outward movement of the latter effects a positive encircling and gripping movement of said hook means relative to each other and said cushion means.

22. A tree shaking mechanism comprising: a tractor, a boom, means carried by the tractor for mounting said boom in freely suspended relation relative to the tractor; means to pivot said boom whereby its free end is elevatable with respect to the ground; hollow shaft means carried within said boom; means to axially reciprocate said hollow shaft means; an inner shaft slidably received within said hollow shaft means; spring means between said shaft means normally urging said inner shaft toward a rear position within said hollow shaft means; a hooking mechanism carried at the outer end of said hollow shaft means, said hooking mechanism including support means mounted for pivotal movement relative to said hollow shaft means, opposed hook members pivotally mounted on the support means, and cushion means mounted on said support means between said hook means; means to urge said inner shaft outward with respect to said hollow shaft means; and link means associated with said hook means and said inner shaft means whereby outward movement of the latter effects a positive encircling and gripping movement of said hook means relative to each other and said cushion means.

23. A tree shaking mechanism as in claim 22 wherein said boom is mounted for axial rotation within a freely suspended gimbal mounting.

24. A tree shaking mechanism as in claim 23 wherein said gimbal mounting is pivotally supported at the free end of a horizontal swing arm carried by the tractor.

25. A tree shaking mechanism as in claim 24 wherein said horizontal swing arm is supported on a vertical hoist carried by the tractor.

References Cited in the file of this patent

UNITED STATES PATENTS

| | | |
|---|---|---|
| 1,626,068 | Bartlett | Apr. 26, 1927 |
| 2,159,311 | Berger | May 23, 1939 |
| 2,449,487 | Kroll | Sept. 14, 1948 |
| 2,646,304 | Chadwick | July 21, 1953 |
| 2,735,255 | Harper et al. | Feb. 21, 1956 |